(12) United States Patent
Fujita et al.

(10) Patent No.: US 7,666,930 B2
(45) Date of Patent: Feb. 23, 2010

(54) MASTER BATCH CONTAINING HEAT RADIATION SHIELDING COMPONENT, AND HEAT RADIATION SHIELDING TRANSPARENT RESIN FORM AND HEAT RADIATION SHIELDING TRANSPARENT LAMINATE FOR WHICH THE MASTER BATCH HAS BEEN USED

(75) Inventors: Kenichi Fujita, Chiba (JP); Kenji Adachi, Chiba (JP)

(73) Assignee: Sumitomo Metal Mining Co., Ltd., Tokyo (JP)

(*) Notice: Subject to any disclaimer, the term of this patent is extended or adjusted under 35 U.S.C. 154(b) by 436 days.

(21) Appl. No.: 11/226,236

(22) Filed: Sep. 15, 2005

(65) Prior Publication Data

US 2006/0009559 A1   Jan. 12, 2006

Related U.S. Application Data

(62) Division of application No. 10/622,513, filed on Jul. 21, 2003, now abandoned.

(30) Foreign Application Priority Data

Jul. 31, 2002   (JP) .............................. 2002-223896

(51) Int. Cl.
  *C08J 3/22* (2006.01)
  *C08K 3/10* (2006.01)
(52) U.S. Cl. .................. 523/351; 523/200; 524/403; 524/404
(58) Field of Classification Search .................. 523/135, 523/351; 524/403, 404
  See application file for complete search history.

(56) References Cited

U.S. PATENT DOCUMENTS 6,319,613 B1 * 11/2001 Takeda et al. ............... 428/412

2002/0086926 A1   7/2002   Fisher ........................ 524/403
2004/0071957 A1   4/2004   Fujita ........................ 428/328

FOREIGN PATENT DOCUMENTS

| EP | 0 459 704 A1 | 12/1991 |
|----|--------------|---------|
| JP | 61-277437    | 12/1986 |
| JP | 2-173060     | 7/1990  |
| JP | 5-78544      | 3/1993  |
| JP | 6-256541     | 9/1994  |
| JP | 6-264050     | 9/1994  |
| JP | 7-69632      | 3/1995  |
| JP | 10-146919    | 6/1998  |
| JP | 11-181336    | 7/1999  |
| JP | 2000-096034  | 4/2000  |
| JP | 2000-169765  | 6/2000  |
| JP | 2001-179887  | 7/2001  |
| JP | 2002-369629 A | 12/2002 |

OTHER PUBLICATIONS

Hawley's Condensed Chemical Dictionary, 13$^{th}$ Edition, 1997, pp. 703-704.*
Wypych, George. Handbook of Fillers, 2$^{nd}$ Edition. Toronto, Plastics Design Library, 2000, p. 312 TP 1114.W96.

* cited by examiner

*Primary Examiner*—Vickey Nerangis
(74) *Attorney, Agent, or Firm*—Kratz, Quintos & Hanson, LLP

(57) ABSTRACT

In a master batch containing a heat radiation shielding component, which is used to produce heat radiation shielding transparent resin forms, the master batch has as chief components a thermoplastic resin and a hexaboride represented by $XB_6$, wherein X is at least one selected from La, Ce, Pr, Nd, Gd, Tb, Dy, Ho, Y, Sm, Eu, Er, Tm, Yb, Lu, Sr and Ca. The hexaboride, which is a heat radiation shielding component, is contained in an amount of from 0.01 part by weight or more to less than 20 parts by weight based on 100 parts by weight of said thermoplastic resin. The use of this master batch enables simple production of heat radiation shielding transparent resin forms having a high visible-light transmission power and a high heat radiation shielding performance, without relying on any high-cost physical film formation methods.

3 Claims, No Drawings

US 7,666,930 B2

MASTER BATCH CONTAINING HEAT RADIATION SHIELDING COMPONENT, AND HEAT RADIATION SHIELDING TRANSPARENT RESIN FORM AND HEAT RADIATION SHIELDING TRANSPARENT LAMINATE FOR WHICH THE MASTER BATCH HAS BEEN USED

This application is Divisional Application of prior application Ser. No. 10/622,513, filed on Jul. 21, 2003 now abandoned, which is hereby incorporated by reference.

BACKGROUND OF THE INVENTION

1. Field of the Invention

This invention relates to a master batch used in producing heat radiation shielding forms (extruded or molded forms) which are widely utilized for roofing and wall materials of buildings, window materials used at openings of automobiles, electric trains, aircrafts and so forth, arcades, ceiling domes, carports and so forth. More particularly, it relates to a master batch containing a heat radiation shielding component, used in producing transparent resin forms having good visible-light transmission properties and a superior heat radiation shielding performance, and also relates to a heat radiation shielding transparent resin form, and a heat radiation shielding transparent laminate, for which this master batch has been used.

2. Description of the Related Art

Solar radiations which enter various buildings and vehicles through their "openings" such as windows and doors include visible-light rays and besides ultraviolet radiations and infrared radiations. Among the infrared radiations included in such solar radiations, near-infrared radiations of 800 to 2,500 nm in wavelength are called heat radiations, and enter through the opening to cause a temperature rise in the room. In order to avoid such a temperature rise, in recent years, in the field of window materials for various buildings and vehicles, there is a rapid increase in demand for heat radiation shielding forms which can shield heat radiations while taking in visible-light rays sufficiently and can prevent the temperature rise in the room while keeping brightness. Patents concerning such heat radiation shielding forms are proposed in a large number.

For example, a heat radiation shielding sheet is proposed in which a heat radiation reflecting film comprising a transparent resin film on which a metal or a metal oxide has been vacuum-deposited is bonded to a transparent form such as a glass sheet, an acrylic sheet or a polycarbonate sheet (see Japanese Patent Applications Laid-open No. 61-277437, No. 10-146919, No. 2001-179887, etc.). However, this heat radiation reflecting film itself is very expensive and also requires a complicate process having a bonding step and so forth, resulting in a high cost. In addition, the heat radiation shielding sheet has a disadvantage that the adhesion between the transparent form and the reflecting film is not so good as to cause peeling of the film as a result of changes with time.

Heat radiation shielding sheets in which metals or metal oxides are directly vacuum-deposited on the surfaces of transparent forms are also proposed in a large number. These, however, have a problem that, in producing such heat radiation shielding sheets, an apparatus is necessary which requires environment control in a high vacuum and in a high precision, resulting in a bad mass productivity and poor general-purpose properties.

Besides, also proposed are, e.g., a heat radiation shielding sheet, and a film used therefor, in which an organic infrared absorber typified by a phthalocyanine compound or an anthraquinone compound is kneaded into a thermoplastic transparent resin such as polyethylene terephthalate resin, polycarbonate resin, acrylic resin, polyethylene resin or polystyrene resin (see Japanese Patent Applications Laid-open No. 6-256541, No. 6-264050, etc.). However, in order to shield the heat radiations sufficiently, the infrared absorber must be mixed in a large quantity. Its mixing in a large quantity leaves a problem that the ability to transmit visible light rays may lower. Also, since an organic compound is used, their use in window materials or the like for buildings and vehicles which are always directly exposed to sunlight involves a difficulty in weatherability, and can not necessarily said to be appropriate.

Further proposed is, e.g., a heat radiation shielding sheet in which inorganic particles of titanium oxide having heat radiation reflectivity or mica or the like coated with titanium oxide are kneaded into a transparent resin such as acrylic resin or polycarbonate resin (see Japanese Patent Applications Laid-open No. 2-173060, No. 5-78544, etc). This sheet, however, requires addition of heat radiation reflecting particles in a large quantity in order to improve heat radiation shielding power, so that the visible-light transmission properties may lower with an increase in the quantity of the heat radiation reflecting particles mixed. On the other hand, the addition of heat radiation reflecting particles in a small quantity may bring an improvement in the visible-light transmission power but may result in a low heat radiation shielding power. Thus, there has been a problem that it is difficult to satisfy the heat radiation shielding power and the visible-light transmission power simultaneously. In addition, the mixing of heat radiation reflecting particles in a large quantity involves a problem in view of strength that transparent resin forms may have low physical properties, in particular, a low impact resistance and a low toughness.

Under such technical backgrounds, the present inventors have already proposed a heat radiation shielding coating liquid in which fine hexaboride particles are incorporated in a binder of various types, and a heat radiation shielding film obtained by coating a form of various types with this coating liquid, followed by drying (see, e.g., Japanese Patent Applications Laid-open No. 11-181336, No. 2000-96034 and No. 2000-169765).

In these proposals, however, nothing has been brought forward with regard to master batches used in producing heat radiation shielding forms.

SUMMARY OF THE INVENTION

Accordingly, the present inventors have made studies in variety, taking note of hexaborides, which have free electrons in a large quantity. As the result, they have succeeded in making up a master batch containing a heat radiation shielding component, obtained by making a hexaboride into ultrafine particles and dispersing the ultrafine particles in a thermoplastic resin by a conventional mixing means.

They have also discovered that the master batch containing a heat radiation shielding component may be diluted and mixed with a thermoplastic resin form material and the mixture obtained may be formed in any desired shapes of a sheet or plate, a film, a sphere and so forth by a known method such as extrusion, injection molding or compression molding and this enables production of a heat radiation shielding transparent resin form and a heat radiation shielding transparent laminate that have a maximum transmittance in the visible light region and also show a strong absorption, and have a minimum transmittance, in the infrared region. The present invention has been accomplished based on such technical discoveries.

More specifically, an object of the present invention is to provide a master batch containing a heat radiation shielding component by the use of which (master batch) heat radiation shielding transparent resin forms of various shapes, having a high heat radiation shielding performance while maintaining a superior visible-light transmission power, can be produced by a simple method without use of any high-cost physical film formation methods.

Another object of the present invention is to provide a heat radiation shielding transparent resin form, and a heat radiation shielding transparent laminate, for which the master batch containing a heat radiation shielding component has been used.

That is, the master batch containing a heat radiation shielding component, which is used to produce heat radiation shielding transparent resin forms, comprises as chief components a thermoplastic resin and a hexaboride represented by $XB_6$, wherein X is at least one selected from La, Ce, Pr, Nd, Gd, Tb, Dy, Ho, Y, Sm, Eu, Er, Tm, Yb, Lu, Sr and Ca;

the hexaboride, which is a heat radiation shielding component, being contained in an amount of from 0.01 part by weight or more to less than 20 parts by weight based on 100 parts by weight of the thermoplastic resin.

The heat radiation shielding transparent resin form of the present invention is characterized by being obtained by diluting and mixing the above master batch containing a heat radiation shielding component, with a thermoplastic-resin form material of the same type as the thermoplastic resin of the master batch or a different type of thermoplastic-resin form material having a compatibility with the master batch, and forming (extruding or molding) the resulting mixture in a stated shape.

The heat radiation shielding transparent laminate of the present invention is also characterized by being obtained by laminating the above heat radiation shielding transparent resin form to other transparent form.

DESCRIPTION OF THE PREFERRED EMBODIMENTS

The present invention is described below in detail.

The master batch of the present invention is used to produce heat radiation shielding transparent resin forms, and contains as chief components a thermoplastic resin and a hexaboride which is a heat radiation shielding component.

The master batch containing a heat radiation shielding component according to the present invention is prepared by uniformly dispersing in a thermoplastic resin fine hexaboride $XB_6$ particles serving as the heat radiation shielding component. The hexaboride used in the present invention may typically include lanthanum hexaboride ($LaB_6$), cerium hexaboride ($CeB_6$), praseodymium hexaboride ($PrB_6$), neodymium hexaboride ($NdB_6$), gadolinium hexaboride ($GdB_6$), terbium hexaboride ($TbB_6$), dysprosium hexaboride ($DyB_6$), holmium hexaboride ($HoB_6$), yttrium hexaboride ($YB_6$), samarium hexaboride ($SmB_6$), europium hexaboride ($EuB_6$), erbium hexaboride ($ErB_6$), thulium hexaboride ($TmB_6$), ytterbium hexaboride ($YbB_6$), lutetium hexaboride ($LuB_6$), lanthanum-cerium hexaboride [(La, Ce) $B_6$], strontium hexaboride ($SrB_6$) and calcium hexaboride ($CaB_6$).

As the fine hexaboride particles used in the present invention, their surfaces may preferably not stand oxidized. In many cases, however, they usually stand slightly oxidized, and also it can not be avoided to a certain extent that the oxidation of surfaces takes place in the step of dispersing the fine particles. Even in such a case, however, there is no change in the effectiveness of showing heat radiation shielding effect. Hence, it is also possible to use fine hexaboride particles standing surface-oxidized.

These fine hexaboride particles also have a greater heat radiation shielding effect as they have a higher perfectness as crystals. However, even those having so low crystallizability as to form a broad diffraction peak in X-ray diffraction may be used in the present invention because they can show a heat radiation shielding effect as long as the basic bonds in the interiors of the fine particles consist of bonds between each metal and boron.

These fine hexaboride particles are also in the form of a powder having color such as grayish black, brownish black or greenish black. If, however, they are made to have a particle diameter sufficiently smaller than visible-light wavelength and brought into a state that they have been dispersed in the heat radiation shielding transparent resin form, the visible-light transmission properties come therefrom in the heat radiation shielding transparent resin form. Nevertheless, the infrared shielding power can sufficiently be retained. The reason therefor has not been elucidated in detail. It is presumed that the free electrons in these fine particles are in a large quantity and the absorption energy of indirect transition between bands that is due to free electrons in the interiors, and at the surfaces, of the fine particles is just in the vicinities of from visible to infrared, and hence the heat radiations in this wavelength region are selectively reflected and absorbed.

According to experiments, it has been observed that, in a film in which any of these fine particles has well finely and uniformly been dispersed, its transmittance has a maximum value at wavelengths between 400 nm and 700 nm and has a minimum value at wavelengths between 700 nm and 1,800 nm, and also that the difference in transmittance between these maximum value and minimum value is 15 points or more. Taking account of a hanging bell type that the visible-light wavelength is 380 nm to 780 nm and the visibility has a peak at about 550 nm, such a heat radiation shielding transparent resin form has characteristics that it transmits visible light effectively and reflects and absorbs the other radiations effectively.

Here, the above fine hexaboride particles have very high heat radiation shielding power per unit weight. It has been ascertained that they exhibit their effect when they are used in an amount of 1/30 or less, compared with tin-doped indium oxide (ITO; see Japanese Patent Application Laid-open No. 7-69632) and antimony-doped tin oxide (ATO) which are utilized as infrared radiation cut-off powders. Hence, the amount of the whole fine particles to be used can vastly be cut down. This enables dissolution of the problem in view of strength that the transparent resin forms may have low physical properties, in particular, a low impact resistance and a low toughness; the problem being caused when the heat radiation shielding particles are mixed in the heat radiation shielding transparent resin form in a large quantity. In addition, the fine hexaboride particles have absorption in the visible-light region when used in a large quantity, and hence the absorption in the visible-light region can freely be controlled by controlling the quantity of the particles to be added, also making it possible to adjust brightness or to apply the forms to privacy-protective parts or the like.

As to the particle diameter of the fine hexaboride particles used in the present invention, it may be arbitrary as long as they function as the heat radiation shielding component. The fine hexaboride particles may preferably have an average particle diameter of 1,000 nm or less, and more preferably 200 nm or less. This is because any fine particles having an average particle diameter larger than 1,000 nm or coarse particles formed by agglomeration of fine particles may act as a light scattering source of the heat radiation shielding transparent resin form produced and the transparent resin form looks cloudy. As the lower limit, there is no particular limitation. The fine hexaboride particles may preferably have particle diameter as small as possible, as long as such particles can be produced (actually, it is difficult to produce hexaboride particles having a diameter of less than 1 nm).

However, transparent roofing materials or the like may be required to have light transmission properties which are opaque rather than transparent. In such a case, the heat radiation shielding transparent resin form may preferably be so constructed that particles having larger particle diameter are used so as to promote light scattering. However, particles larger than 1,000 nm may cause attenuation of the heat radiation shielding power itself, and hence they may preferably have the average particle diameter of 1,000 nm or less, and more preferably from 500 nm to 600 nm.

As the fine hexaboride particles used in the present invention, those having been surface-treated with a silane compound, a titanium compound or a zirconia compound may be used. The treatment of fine-particle surfaces with such a compound enables improvement in water resistance of the hexaboride.

As to the thermoplastic resin used in the present invention, there are no particular limitations as long as it is a transparent thermoplastic resin having high light transmission properties in the visible-light region. For example, it may include thermoplastic resins having, when the heat radiation shielding transparent resin form is formed in a plate of 3 mm in thickness, a visible-light transmittance of 50% or more as prescribed in JIS R 3106 and a haze of 30% or less as prescribed in JIS K 7105. Stated specifically, it may include acrylic resins, polycarbonate resins, polyether-imide resins, polyester resins, polystyrene resins, polyether-sulfone resins, fluorine resins and polyolefin resins. Where it is intended to use the heat radiation shielding transparent resin form in window materials or the like of various buildings and vehicles, acrylic resins, polycarbonate resins, polyether-imide resins and fluorine resins are preferred taking account of transparency, impact resistance, weatherability and so forth.

As the polycarbonate resins, aromatic polycarbonates are preferred. The aromatic polycarbonates may include polymers obtained from at least one divalent phenolic compound typified by 2,2-bis(4-hydroxyphenyl)propane or 2,2-bis(3,5-dibromo-4-hydroxyphenyl)propane and a carbonate precursor typified by phosgene or diphenyl carbonate, and by a known process such as interfacial polymerization, solution polymerization or solid-phase polymerization.

The acrylic resins may include polymers or copolymers obtained using as a chief raw material methyl methacrylate, ethyl methacrylate, propyl methacrylate or butyl methacrylate and optionally using as a copolymer component an acrylic ester having an alkyl group having 1 to 8 carbon atoms, vinyl acetate, styrene, acrylonitrile or methacrylonitrile. Acrylic resins obtained by more multi-stage polymerization may also be used.

The fluorine resins may include polyfluoroethylene, polydifluoroethylene, polytetrafluoroethylene, an ethylene-difluoroethylene copolymer, an ethylene-tetrafluoroethylene copolymer and tetrafluoroethylene-perfluoroalkoxyethylene copolymers.

As to the content of the hexaboride in respect to the thermoplastic resin, the hexaboride may be in a content of from 0.01 part by weight or more to less than 20 parts by weight, and preferably from 0.1 part by weight or more to 10 parts by weight or less, based on 100 parts by weight of the thermoplastic resin. If the content of the hexaboride is larger than this range, the fine hexaboride particles may mutually agglomerate to come dispersed insufficiently in the resin, so that the heat radiation shielding transparent resin form produced may have a high haze value. There is also a possibility of causing dilution non-uniformity when the master batch containing the heat radiation shielding component (hereinafter often "HRS-component-containing master batch") is diluted and mixed with a thermoplastic-resin form material. If on the other hand the content of the hexaboride is smaller than the above range, any sufficient heat radiation shielding power may be not obtainable especially when the transparent resin form produced is a film of 100 µm or less in thickness, depending on the thickness of the heat radiation shielding transparent resin form produced.

As methods of dispersing the fine hexaboride particles in the thermoplastic resin, any methods may be selected as long as they are methods by which the fine particles can uniformly be dispersed in the resin. For example, a method may be used in which the fine hexaboride particles are dispersed in any desired solvent by means of a bead mill, a ball mill or a sand mill or by ultrasonic dispersion to prepare a dispersion of the fine hexaboride particles, and this dispersion and powder or pellets of the thermoplastic resin, optionally together with other additive(s), are uniformly melt-mixed by means of a mixing machine such as a ribbon blender, a tumbling mixer, a Nauta mixer, a Henschel mixer, a super mixer or a planetary-screw mixer and a kneading machine such as a Banbury mixer, a kneader, a roll mill, a single-screw extruder or a twin-screw extruder while removing the solvent, thus a mixture can be prepared in which the fine hexaboride particles have uniformly been dispersed in the thermoplastic resin. The mixture in which the fine hexaboride particles have uniformly been dispersed in the thermoplastic resin may also be prepared by a method in which the solvent in the dispersion of the fine hexaboride particles is removed by a known method and the powder obtained and the powder or pellets of the thermoplastic resin, optionally together with other additive(s), are uniformly melt-mixed. Besides, a method may be used in which powder of the fine hexaboride particles having not been subjected to dispersion treatment is directly added to the thermoplastic resin and these are uniformly melt-mixed. It may suffice for the fine hexaboride particles to be uniformly dispersed in the thermoplastic resin, and methods are not limited to these.

The mixture thus obtained may be kneaded by means of a vented single-screw extruder or twin-screw extruder and then worked into pellets to obtain the HRS-component-containing master batch of the present invention.

The pellets may be obtained by a most commonly available method in which melt-extruded strands are cut. Thus, as their shapes, a columnar shape and a prismatic shape are available. It is also possible to employ "hot-cut pelletizing", in which the melt-extruded product is directly cut. In such a case, it is common for the pellets to have a closely spherical shape.

Thus, the HRS-component-containing master batch of the present invention may employ any form or any shape. It may preferably be in the same form and shape as those of the thermoplastic-resin form material used to dilute the master batch when the heat radiation shielding transparent resin form is formed.

The heat radiation shielding transparent resin form according to the present invention is obtained by diluting and mixing the HRS-component-containing master batch with a thermoplastic-resin form material of the same type as the thermoplastic resin of the master batch or a different type of thermoplastic-resin form material having a compatibility with the master batch and the mixture obtained is formed in a stated shape.

As the shape of the heat radiation shielding transparent resin form, the resin form may be formed in any shape as desired, and may be in a flat shape or a curved shape. As to the thickness of the heat radiation shielding transparent resin form as well, it may be set to any desired thickness according to what is necessary for the shapes of a plate and up to a film. A resin sheet formed in a flat shape may be formed by post working in any desired shape such as a spherical shape.

As methods of forming the heat radiation shielding transparent resin form, any methods such as injection molding, extrusion, compression molding and rotary molding are available. In particular, a method of obtaining the form by injection molding and a method of obtaining the form by extrusion may preferably be employed. As a method of obtaining a sheet- or platelike or filmlike form by the extrusion, such a form is produced by a method in which a molten thermoplastic resin extruded using an extruder such as a T-die is taken off while being cooled by means of a cooling roll. Forms obtained by the injection molding are preferably used in the bodies of cars such as window glass and roofs of automobiles. Sheet- or platelike or filmlike forms obtained by the extrusion are preferably used in constructions such as arcades and carports.

The heat radiation shielding transparent resin form itself may be used alone in structural materials such as window glass and arcades, and besides may be used in the structural materials, as an integral heat radiation shielding transparent laminate obtained by laminating the transparent resin form to other transparent forms such as inorganic glass sheets, resin glass sheets or resin films by any desired method. For example, a heat radiation shielding transparent resin form beforehand formed in the shape of film may be laminated to and integrated with an inorganic glass sheet by heat lamination to obtain a heat radiation shielding transparent laminate having heat radiation shielding performance and scattering preventive performance. Also, at the same time when the heat radiation shielding transparent resin form is formed, it may be laminated to and integrated with other transparent form by heat lamination, co-extrusion, press molding, injection molding or the like to obtain the heat radiation shielding transparent laminate. Such a heat radiation shielding transparent laminate can be used as a more useful structural material because it can complement any each other's disadvantages while effectively exhibiting each other's advantages the both forms have.

The master batch containing the heat radiation shielding component according to the present invention may further be mixed with any of commonly available additives. For example, usable as additives are dyes or pigments such as azo dyes, cyanine dyes, quinoline dyes, perylene dyes and carbon black which are commonly used to color thermoplastic resins in order to impart any desired color tones as occasion calls; as well as hindered-phenol type or phosphorus type stabilizers; release agents; hydroxybenzophenone type, salicylic acid type, HALS type, triazole type or triazine type ultraviolet absorbers; coupling agents; surface-active agents; antistatic agents and so forth; any of which may be mixed in an effective quantity.

The use of the HRS-component-containing master batch according to the present invention, in which the hexaboride has uniformly been dispersed as the heat radiation shielding component in the thermoplastic resin as described above in detail, makes it possible to provide the heat radiation shielding transparent resin form and the heat radiation shielding transparent laminate which have a high heat radiation shielding performance and also have a high transmission power in the visible-light region, without use of any high-cost physical film formation methods and any complicated process.

The resulting heat radiation shielding transparent resin form and heat radiation shielding transparent laminate, when used as materials for windows of automobiles and buildings, carports, arcades and so forth, also have the effect of shielding the solar energy that may enter therethrough, to reduce a load of air conditioning (cooling) and lessen a feeling of the heat, and at the same time have the effect of being useful for energy saving and having a high utility from an environmental viewpoint.

The present invention is described below in greater detail by giving Examples. The present invention is by no means limited by the following Examples.

In the following Examples, only examples making use of lanthanum hexaboride are described. It, however, has been ascertained that, like Examples disclosed in Japanese Patent Application Laid-open No. 2000-96034 as proposed by the present applicant, the same effect as that in the lanthanum hexaboride is obtainable in respect of other hexaborides as well.

EXAMPLE 1

200 g of fine lanthanum hexaboride ($LaB_6$) particles of 67 nm in average particle diameter as a heat radiation shielding component, 700 g of toluene and appropriate amounts of water and a dispersant were mixed, and the mixture obtained was further mixed for 100 hours by means of a ball mill making use of zirconia balls of 4 mm in diameter to prepare 1 kg of a dispersion of fine lanthanum hexaboride particles (hereinafter simply "liquid A").

Further, the toluene in the liquid A was removed using a spray dryer to obtain a disperse powder of fine lanthanum hexaboride particles (hereinafter simply "powder A").

Next, to pellets of a thermoplastic resin polycarbonate resin, the powder A thus obtained was so added as to be in an $LaB_6$ concentration of 2.0% by weight (corresponding to 2.0 parts by weight based on 100 parts by weight of the resin), and these were uniformly mixed by means of a blender, followed by melt-kneading using a twin-screw extruder. Strands extruded therefrom were cut into pellets to obtain a master batch containing the heat radiation shielding component (hereinafter simply "master batch A").

Next, the master batch A and polycarbonate resin pellets were uniformly so mixed by means of a blender that the former was diluted with the latter to give an $LaB_6$ concentration of 0.01% by weight, followed by extrusion using a T-die, into a sheet of 1.0 mm in thickness to obtain a heat radiation shielding transparent resin form in which the fine lanthanum hexaboride particles stood uniformly dispersed in the whole resin.

Spectral characteristics of the heat radiation shielding transparent resin form (polycarbonate sheet) thus produced were measured with a spectrophotometer U-4000, manufactured by Hitachi Ltd., and solar-radiation transmittance and visible-light transmittance were calculated according to JIS R 3106.

Results obtained are shown in Table 1.

EXAMPLE 2

A master batch containing a heat radiation shielding component was obtained in the same manner as in Example 1 except that acrylic resin was used as the thermoplastic resin to prepare the pellets. More specifically, the powder A and acrylic resin pellets were so mixed as to give the numerical value as shown in the column "Master batch composition" in Table 1, and were melt-kneaded using a twin-screw extruder. Strands extruded therefrom were cut into pellets to obtain a master batch containing the heat radiation shielding component according to this Example (hereinafter simply "master batch B").

Next, a heat radiation shielding transparent resin form was obtained in the same manner as in Example 1 except that the master batch was diluted with acrylic resin pellets. More specifically, the master batch B and acrylic resin pellets were uniformly so mixed by means of a blender that the former was diluted with the latter to give the numerical value as shown in the column "Composition of heat radiation shielding transparent resin form" in Table 1, followed by extrusion using a T-die, into a sheet of 1.0 mm in thickness to obtain a heat radiation shielding transparent resin form in which the fine lanthanum hexaboride particles stood uniformly dispersed in the whole resin. Spectral characteristics of this heat radiation shielding transparent resin form are also shown in Table 1.

EXAMPLE 3

A master batch containing a heat radiation shielding component was obtained in the same manner as in Example 1 except that polyether-imide resin was used as the thermoplastic resin to prepare the pellets. More specifically, the powder A and polyether-imide resin pellets were so mixed as to give the numerical value as shown in the column "Master batch composition" in Table 1, and were melt-kneaded using a twin-screw extruder. Strands extruded therefrom were cut into pellets to obtain a master batch containing the heat radiation shielding component according to this Example (hereinafter simply "master batch C").

Next, a heat radiation shielding transparent resin form was obtained in the same manner as in Example 1 except that the master batch was diluted with polyether-imide pellets. More specifically, the master batch C and polyether-imide resin pellets were uniformly so mixed by means of a blender that the former was diluted with the latter to give the numerical value as shown in the column "Composition of heat radiation shielding transparent resin form" in Table 1, followed by extrusion using a T-die, into a sheet of 1.0 mm in thickness to obtain a heat radiation shielding transparent resin form in which the fine lanthanum hexaboride particles stood uniformly dispersed in the whole resin. Spectral characteristics of this heat radiation shielding transparent resin form are also shown in Table 1.

EXAMPLE 4

A master batch containing a heat radiation shielding component was obtained in the same manner as in Example 1 except that polyethylene terephthalate resin was used as the thermoplastic resin to prepare the pellets. More specifically, the powder A and polyethylene terephthalate resin pellets were so mixed as to give the numerical value as shown in the column "Master batch composition" in Table 1, and the subsequent procedure in Example 1 was repeated to obtain a master batch containing the heat radiation shielding component according to this Example (hereinafter simply "master batch D").

Next, this master batch D and polyethylene terephthalate resin pellets were uniformly so mixed by means of a blender that the former was diluted with the latter to give the numerical value as shown in the column "Composition of heat radiation shielding transparent resin form" in Table 1, followed by extrusion using a T-die, into a film of 0.1 mm in thickness to obtain a heat radiation shielding transparent resin form in which the fine lanthanum hexaboride particles stood uniformly dispersed in the whole resin. Spectral characteristics of this heat radiation shielding transparent resin form are also shown in Table 1.

EXAMPLE 5

A master batch containing a heat radiation shielding component was obtained in the same manner as in Example 1 except that ETFE (ethylene-tetrafluoroethylene copolymer) resin was used as the thermoplastic resin to prepare the pellets. More specifically, the powder A and ETFE resin pellets were so mixed as to give the numerical value as shown in the column "Master batch composition" in Table 1, and the subsequent procedure in Example 1 was repeated to obtain a master batch containing the heat radiation shielding component according to this Example (hereinafter simply "master batch E").

Next, a heat radiation shielding transparent resin form was obtained in the same manner as in Example 4 except that the master batch was diluted with ETFE pellets. More specifically, the master batch E and ETFE resin pellets were so mixed that the former was diluted with the latter to give the numerical value as shown in the column "Composition of heat radiation shielding transparent resin form" in Table 1, and the subsequent procedure in Example 4 was repeated to obtain a heat radiation shielding transparent resin form in which the fine lanthanum hexaboride particles stood uniformly dispersed in the whole resin. Spectral characteristics of this heat radiation shielding transparent resin form are also shown in Table 1.

EXAMPLE 6

To 950 g of the liquid A, 50 g of methyltrimethoxysilane was added, and these were stirred by mean of a mechanical stirrer. Thereafter, the toluene in the liquid A was removed using a spray dryer to obtain a disperse powder of fine lanthanum hexaboride particles surface-treated with a silane compound (hereinafter simply "powder B").

Next, in the same manner as in Example 1, the powder B and polycarbonate resin pellets were so mixed as to give the numerical value as shown in the column "Master batch composition" in Table 1, and the subsequent procedure in Example 1 was repeated to obtain a master batch containing the heat radiation shielding component according to this Example (hereinafter simply "master batch F").

Then, in the same manner as in Example 1, the master batch F and polycarbonate resin pellets were so mixed that the former was diluted with the latter to give the numerical value as shown in the column "Composition of heat radiation shielding transparent resin form" in Table 1, and the subsequent procedure in Example 1 was repeated to obtain a heat radiation shielding transparent resin form in which the fine lanthanum hexaboride particles stood uniformly dispersed in the whole resin. Spectral characteristics of this heat radiation shielding transparent resin form (polycarbonate sheet) are also shown in Table 1.

COMPARATIVE EXAMPLE

To pellets of a thermoplastic resin polycarbonate resin, the powder A was so added as to be in an $LaB_6$ concentration of 16.7% by weight (corresponding to 20.0 parts by weight based on 100 parts by weight of the resin), and these were uniformly mixed by means of a blender, followed by melt-kneading using a twin-screw extruder. Strands extruded therefrom were cut into pellets to obtain a master batch containing the heat radiation shielding component (hereinafter simply "master batch G").

Next, the master batch G and polycarbonate resin pellets were uniformly so mixed by means of a blender that the former was diluted with the latter to give an $LaB_6$ concentration of 0.01% by weight, followed by extrusion using a T-die, into a sheet of 1.0 mm in thickness to obtain a heat radiation shielding transparent resin form according to Comparative Example, in which the fine lanthanum hexaboride particles stood uniformly dispersed in the whole resin. Spectral characteristics of this heat radiation shielding transparent resin form are also shown in Table 1.

the smaller). Hence, the fine $LaB_6$ particles did not stand uniformly dispersed in the resin form, and color shadings were seen. It has also been ascertained that, because of such non-uniform distribution, the solar-radiation transmittance of the heat radiation shielding transparent resin form according to Comparative Example shows a numerical value of 63.0%, which is poorer than those of the heat radiation shielding transparent resin forms according to Examples.

On the other hand, in respect of the HRS-component-containing master batches according to Examples, in which the $LaB_6$ content is set to from 0.01 part by weight or more to less than 20 parts by weight, the disadvantages as in Comparative Example are not seen and it has been ascertained that good heat radiation shielding transparent resin forms can be produced using the HRS-component-containing master batches according to Examples.

TABLE 1

| | Master batch composition | | Composition of heat radiation shielding transparent resin form | Thickness of transparent resin form (mm) | Spectral characteristics | |
|---|---|---|---|---|---|---|
| | Resin used | $LaB_6$ conc. (pbw) | $LaB_6$ concentration (wt. %) | | Visible = light transmittance (%) | Solar radiation transmittance (%) |
| Example: | | | | | | |
| 1 | Polycarbonate | 2.0 | 0.01 | 1.0 | 78.2 | 58.9 |
| 2 | Acrylic | 5.3 | 0.01 | 1.0 | 78.0 | 59.0 |
| 3 | Polyether-imide | 2.0 | 0.01 | 1.0 | 77.9 | 58.5 |
| 4 | Polyethylene terephthalate | 3.1 | 0.10 | 0.1 | 78.5 | 58.8 |
| 5 | Ethylene-tetrafluoroethylene | 2.0 | 0.10 | 0.1 | 78.4 | 58.4 |
| 6 | Polycarbonate | 2.0 | 0.01 | 1.0 | 77.7 | 59.0 |
| Comparative Example: | | | | | | |
| | Polycarbonate | 20.0 | 0.01 | 1.0 | 82.3 | 63.0 |

Remarks:
(1) Numerical values in the column "$LaB_6$ conc." in "Master batch composition" indicate parts by weight based on 100 parts by weight of the resin.
(2) In Example 6, surface-treated fine lanthanum hexaboride particles are used.

Evaluation

1. Evaluation of External Appearance of HRS-Component-Containing Master Batches and Heat Radiation Shielding Transparent Resin Forms According to Examples and Comparative Example:

In the HRS-component-containing master batch according to Comparative Example, its $LaB_6$ content was as large as 20.0 parts by weight based on 100 parts by weight of the polycarbonate resin, and hence it was unable to disperse the fine $LaB_6$ particles uniformly when the master batch was prepared. As the result, coarse particles were seen in the heat radiation shielding transparent resin form produced using the HRS-component-containing master batch according to Comparative Example, and this form had a rough surface.

In the step of diluting the HRS-component-containing master batch according to Comparative Example with the polycarbonate resin pellets, the master batch was added to the polycarbonate resin pellets in a very small quantity (since the $LaB_6$ content was as large as 20.0 parts by weight based on 100 parts by weight of the polycarbonate resin, it follows that the mixing proportion of the HRS-component-containing master batch to the polycarbonate resin pellets for dilution is 2. Evaluation of Water Resistance Test of Heat Radiation Shielding Transparent Resin Forms According to Examples 1 and 6:

To evaluate the water resistance of the heat radiation shielding transparent resin forms according to Examples 1 and 6, their water resistance was compared with that of the following heat radiation shielding transparent laminate produced using a heat radiation shielding coating liquid prepared by incorporating fine hexaboride particles in an inorganic binder.

(Production of Heat Radiation Shielding Transparent Laminate)

An ethyl silicate solution prepared using 10 g of Ethyl Silicate 40, available from Tama Chemical Co., Ltd., a tetra- to pentamer in light of its average degree of polymerization, 27 g of ethanol, 8 g of an aqueous 5% hydrochloric acid solution and 5 g of water was thoroughly mixed and stirred to prepare 50 g of a liquid ethyl silicate mixture (hereinafter simply "liquid B").

Next, the liquid A in Example 1 and this liquid B were mixed, and the resulting mixture was further so diluted with diacetone alcohol as to have an $LaB_6$ concentration of 0.2% by weight and an SiO2 concentration of 2.5% by weight, to prepare a heat radiation shielding coating liquid.

Then, 15 g of this heat radiation shielding coating liquid was coated on a polycarbonate sheet of 2.0 mm in thickness by means of a spin coater, and this coated sheet was put into a 100° C. electric furnace and then heated for 30 minutes to produce a heat radiation shielding transparent laminate having a heat radiation shielding film formed on the polycarbonate sheet. Spectral characteristics of this heat radiation shielding transparent laminate were measured to find that its visible-light transmittance and solar-radiation transmittance were 78% and 57.9%, respectively.

Next, the heat radiation shielding transparent laminate thus obtained was stored for 100 days in a thermo-hygrostat conditioned at a temperature of 80° C. and a humidity of 95% RH, and then its spectral characteristics were again measured to find that the visible-light transmittance and the solar-radiation transmittance were 81% and 62.4%, respectively, showing an increase in visible-light transmittance and solar-radiation transmittance by 3% and 4.5%, respectively.

Meanwhile, the heat radiation shielding polycarbonate sheet obtained in Example 1 was stored for 100 days in the thermo-hygrostat conditioned at a temperature of 80° C. and a humidity of 95% RH, and then its spectral characteristics were again measured to find that the visible-light transmittance and the solar-radiation transmittance were 78.5% and 59.2%, respectively, showing a slight increase in visible-light transmittance and solar-radiation transmittance by 0.3% and 0.3%, respectively.

The heat radiation shielding polycarbonate sheet obtained in Example 6 was also stored for 100 days in the thermo-hygrostat conditioned at a temperature of 80° C. and a humidity of 95% RH, and then its spectral characteristics were again measured to find that the visible-light transmittance and the solar-radiation transmittance were 77.7% and 59.0%, respectively, showing no change in spectral characteristics.

From these results, it is ascertained that, in the heat radiation shielding transparent laminate obtained using the heat radiation shielding coating liquid, because of its very thin heat radiation shielding film, a large number of fine lanthanum hexaboride particles come into contact with water content to cause decomposition of the fine lanthanum hexaboride particles to lower the laminate's heat radiation shielding performance.

On the other hand, it is ascertained that, in the heat radiation shielding polycarbonate sheet obtained in Example 1, the fine lanthanum hexaboride particles are uniformly dispersed in the polycarbonate resin, and the fine lanthanum hexaboride particles less come into contact with water content to bring an improvement in water resistance.

It is also ascertained that, in the heat radiation shielding polycarbonate sheet obtained in Example 6, its water resistance has been more improved than the heat radiation shielding polycarbonate sheet obtained in Example 1, because the fine lanthanum hexaboride particles surface-treated with the silane coupling agent are used.

What is claimed is:

1. A method of producing a heat radiation shielding transparent resin form, comprising the steps of:
    (A) mixing and dispersing fine hexaboride particles having an average particle diameter of 200 nm or less represented by $XB_6$ wherein X is at least one selected from La, Ce, Pr, Nd, Gd, Tb, Dy, Ho, Y, Sm, Eu, Er, Tm, Yb, Lu, Sr and Ca, with a solvent by means of one dispersion method selected from the group consisting of a bead mill, a ball mill, a sand mill and ultrasonic dispersion to obtain a dispersion of the fine hexaboride particles;
    (B) drying the resulting dispersion of the fine hexaboride particles while removing the solvent therefrom to obtain a disperse powder of the fine hexaboride particles;
    (C) uniformly mixing the disperse powder of the fine hexaboride particles with a powder or pellets of a thermoplastic resin by means of a blender to obtain a mixture in which the fine hexaboride particles have uniformly been dispersed in the thermoplastic resin, and then melt-kneading and forming the mixture into pellets, thereby forming a master batch containing the hexaboride as a heat radiation shielding component; and
    (D) diluting and mixing the master batch containing a heat radiation shielding component with a thermoplastic-resin form material of the same type as the thermoplastic resin of the master batch or a different type of thermoplastic-resin form material having a compatibility with the master batch; and forming the resulting mixture;
    wherein the $XB_6$ is contained in the master batch in an amount of from 0.01 part by weight or more to less than 20 parts by weight based on 100 parts by weight of the thermoplastic resin.

2. A method of producing a heat radiation shielding transparent resin form according to claim 1, wherein the thermoplastic resin is at least one selected from an acrylic resin, a polycarbonate resin, a polyether-imide resin, a polystyrene resin, a polyether-sulfone resin, a fluorine resin, a polyolefin resin and a polyester resin.

3. A method of producing a heat radiation shielding transparent resin form according to claim 1 or 2, wherein the fine hexaboride particles have been surface-treated with at least one selected from a silane compound, a titanium compound and a zirconia compound.

\* \* \* \* \*